United States Patent
Xu

(10) Patent No.: US 9,796,404 B2
(45) Date of Patent: Oct. 24, 2017

(54) INTERLOCKING FOLDING COMPONENT AND METHOD THEREOF FOR STROLLERS

(71) Applicant: Jiahong Xu, Dongguan (CH)

(72) Inventor: Jiahong Xu, Dongguan (CH)

(73) Assignee: Dongguan Master Kids Toy Co., Ltd, Dongguan (CN)

( * ) Notice: Subject to any disclaimer, the term of this patent is extended or adjusted under 35 U.S.C. 154(b) by 0 days.

(21) Appl. No.: 14/831,880

(22) Filed: Aug. 21, 2015

(65) Prior Publication Data
US 2017/0050660 A1    Feb. 23, 2017

(51) Int. Cl.
*B62B 7/06*    (2006.01)

(52) U.S. Cl.
CPC ...................... *B62B 7/06* (2013.01)

(58) Field of Classification Search
CPC  B62B 7/06; B62B 7/062; B62B 7/064; B62B 7/14
USPC .................. 280/642, 647, 650, 657, 658
See application file for complete search history.

(56) References Cited

U.S. PATENT DOCUMENTS

| 7,077,420 | B1 * | 7/2006 | Santoski | B62B 7/062 280/639 |
| 8,262,124 | B2 * | 9/2012 | Longenecker | B62B 9/26 280/642 |
| 8,444,172 | B2 * | 5/2013 | Cheng | B62B 9/26 280/650 |
| 8,579,319 | B2 * | 11/2013 | Hu | B62B 7/068 280/642 |
| 8,714,581 | B2 * | 5/2014 | Fritz | B62B 7/08 280/642 |
| 8,870,213 | B1 * | 10/2014 | Xu | B62B 7/08 280/642 |
| 2014/0008895 | A1 * | 1/2014 | Lee | B62B 7/062 280/647 |

\* cited by examiner

*Primary Examiner* — John Walters

(57) ABSTRACT

An interlocking folding component for strollers, comprising: a handle lower tube, bending joints and folding joints installed on the upper end and lower end of the handle lower tube; the folding joint is configured with a first locking device to lock itself to prevent rotation; the bending joint is configured with a second locking device to lock itself to prevent rotation; the second locking device is interlocked with the first locking device and can unlock the first locking device; the upper end of the bending joint is configured with an unlocking device; the unlocking device can be driven to unlock the second locking device, so that the bending joint can rotate, and during rotation. After folding, the stroller occupies a small space and can stand, providing great convenience for transportation and storage.

13 Claims, 13 Drawing Sheets

US 9,796,404 B2

INTERLOCKING FOLDING COMPONENT AND METHOD THEREOF FOR STROLLERS

FIELD OF THE INVENTION

The present invention relates generally to the technical field of stroller products, and more particularly to an interlocking folding component and interlocking folding method which enables one-hand folding and features easy and safe operation of the stroller.

BACKGROUND OF THE INVENTION

A stroller is a carrying and transporting tool designed for babies. It is a convenient tool for adults to take their babies when traveling out and is therefore very popular among consumers.

A conventional stroller generally includes: a carriage frame, a seat fixed on the carriage frame, front wheels and back wheels installed on the lower ends of the carriage frame and a handle installed on the carriage frame. The carriage frame includes: joint components and front leg tubes installed on the joint components, a handle tube, and back leg tubes. The front wheels, back wheels and the handle are respectively installed on the front leg tubes, back leg tubes and a handle tube. To facilitate folding and storage when the stroller is not used, a folding mechanism is provided inside the joint components, so that the folding mechanism can control folding of the stroller for storage and opening for usage. However, the folding mechanism of conventional strollers in the market generally requires the user to use both hands to fold or open the stroller. The operation is quite difficult and requires great effort. Unsmooth folding and opening as well as inconvenient usage and operation may become a disadvantage for the strollers in market competition.

In view of the above problem, the inventor has provided a technical solution as described below.

SUMMARY OF INVENTION

The present invention aims to overcome the deficiencies of the prior-art and provides a an interlocking folding component and interlocking folding method which enables one-hand folding and features easy and safe operation of the stroller.

In order to resolve the aforementioned technical problems, the present invention adopts the technical solution as below: An interlocking folding component for strollers, comprising: a handle lower tube, bending joints and folding joints installed on the upper end and lower end of the handle lower tube; the folding joint is configured with a first locking device to lock itself to prevent rotation; the bending joint is configured with a second locking device to lock itself to prevent rotation; the second locking device is interlocked with the first locking device and can unlock the first locking device; the upper end of the bending joint is configured with an unlocking device; the unlocking device can be driven to unlock the second locking device, so that the bending joint can rotate, and during rotation, the bending joint will pull and unlock the first locking device, so that the folding joint can rotate to fold the stroller.

More particularly, wherein the folding joint is installed with a front leg tube that can fold with respect to the handle lower tube; the lower end of the handle lower tube is installed with a back leg tube that can rotate, and between the back leg tube and front leg tube, a seat frame tube is installed; the handle lower tube, the front leg tube, and the back leg tube are all in arc shape.

More particularly, wherein the folding joint is installed with front leg tube, armrest and back leg tube that can fold with respect to the handle lower tube; between the back leg tube, handle lower tube and front leg tube, an interlocking hinge joint component is installed.

More particularly, wherein the folding joint is installed with front leg tube and back leg tube that can fold with respect to the handle lower tube.

More particularly, wherein the folding joint includes a joint seat a rotating seat installed inside the joint seat and capable of rotation with respect to the joint seat; the joint seat and rotating seat are respectively connected to and fixed with the front leg tube and handle lower tube.

More particularly, wherein the first locking device includes a first spring and folding pulling bar installed on the lower end of the handle lower tube and extending into the rotating seat; the folding pulling bar is installed with first and second iron pins, and is connected to the rotating seat and the joint seat through the first and second iron pins.

More particularly, wherein the bending joint includes lower joint and upper joint that are installed to match each other; the lower joint and upper joint are respectively connected with the handle lower tube and unlocking device.

More particularly, wherein the second locking device includes: driving pulling bar and second spring that extend into the upper joint, and interlocking pulling bar installed on the upper end of the handle lower tube and extending into the lower joint; the driving pulling bar is connected to the unlocking device through a first steel wire; the interlocking pulling bar is connected to the first locking device through a second steel wire.

More particularly, wherein the unlocking device includes handle U-tube installed on the upper end of the bending joint, enclosure installed in the middle of the handle U-tube, driving button installed inside the enclosure to drive the second locking device for unlocking, third spring to match the driving button, and safe button to lock the driving button to prevent its movement.

More particularly, wherein the folding joint includes: an inner joint seat, an outer joint seat installed on the outer side of the inner joint seat and capable of rotation with respect to the inner joint seat and a middle joint seat installed between the inner joint seat and outer joint seat; the inner, outer, and middle joint seats are respectively connected to the front leg tube, handle lower tube and back leg tube, and the middle joint seat is in the shape of a plate, with its periphery configured with a positioning groove.

More particularly, wherein the interlocking hinge joint component includes: first, second and third interlocking plates with their ends hinged with each other; the other terminal portion of the first interlocking plate is connected with the front leg tube, the other terminal portion of the second interlocking plate is connected with the back leg tube, and the other terminal portion of the third interlocking plate is connected with the handle lower tube.

More particularly, wherein the folding joint includes first, second and third joint seat that are hinged with each other, wherein, the second joint seat is in the shape of a plate, and the first, second and third joint seats are respectively connected with the back leg tube, front leg tube and handle lower tube.

More particularly, wherein the first joint seat is configured with a positioning pulling bar to position the first, second and third joint seats after unfolding, and the upper end of the positioning pulling bar is installed with a sixth iron pin, and connected with the second and third joint seat through the sixth iron pin; the lower end of the positioning pulling bar is installed with fourth spring (163) and positioning iron pin that match each other; the positioning iron pin is installed in the positioning chute configured inside the first joint seat.

An interlocking folding method for strollers, comprising the following steps:

first step: provide a stroller, the stroller including an interlocking folding component for strollers;

the second step: activate the unlocking device of the interlocking folding component for strollers, and drive the unlocking device to unlock the locked second locking device in the bending joint, so that the bending joint can rotate;

third step: rotate the bending joint; during rotation, the bending joint will pull the locked first locking device inside the folding joint, and unlock the first locking device, so that the folding joint can rotate; then, by rotating the folding joint, the front and back leg tubes, handle lower tubes, and bending joints connected with the folding joint can be closed to fold the stroller.

Compared with the prior art, the utility model has the beneficial effects are that the present invention enables folding the stroller simply by using one hand to activate the unlocking device 6, with easy and safe operation. After the folding, the front wheels and back wheels installed on the ends of the front and back leg tubes 23 are located in the same horizontal plane, so that the stroller can stand stably. Such a convenience for storage and transportation offers a high competitiveness in the market.

DETAILED DESCRIPTION OF THE PREFERRED EMBODIMENTS

Figure 1:
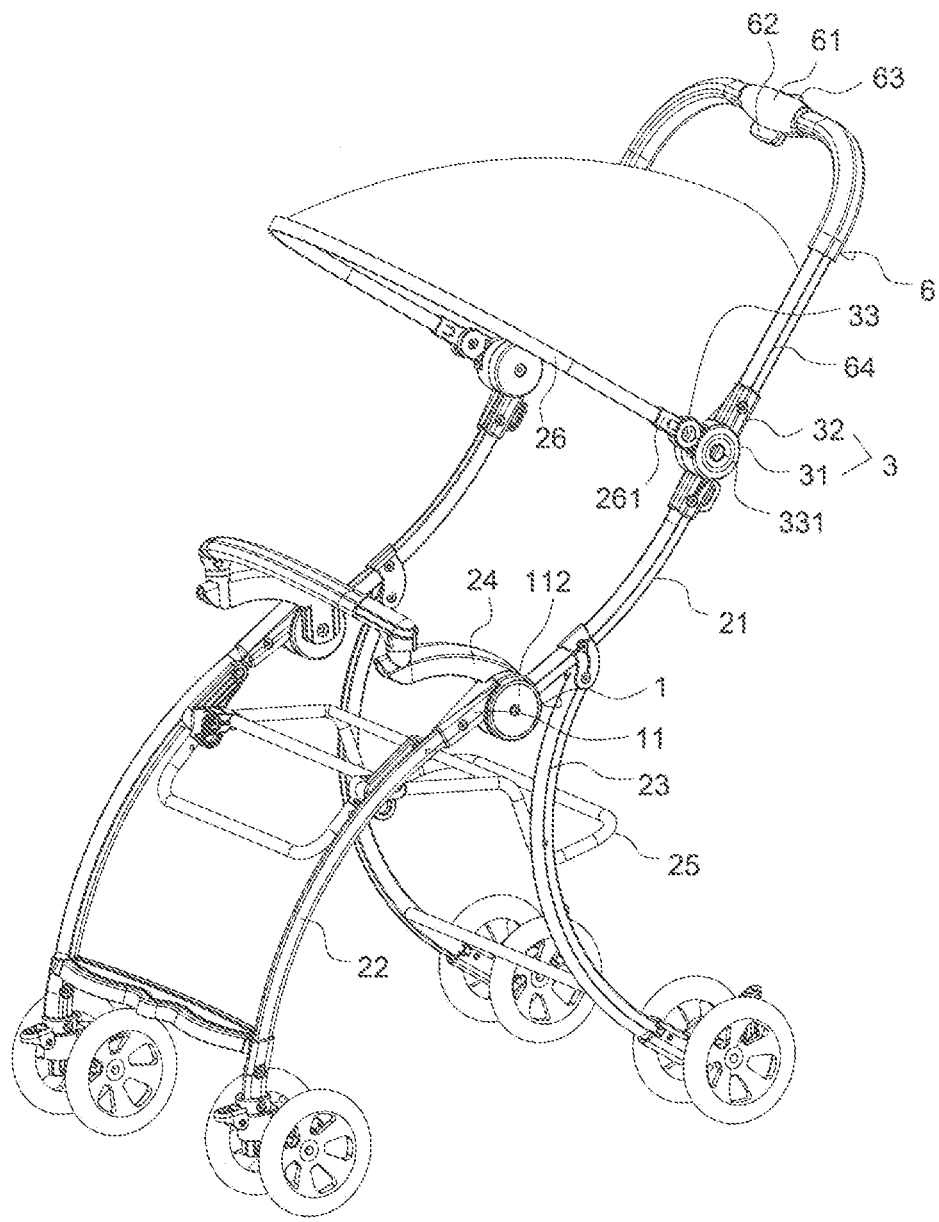
FIG. 1 is a perspective view of embodiment 1 of the present invention.
Figure 2:
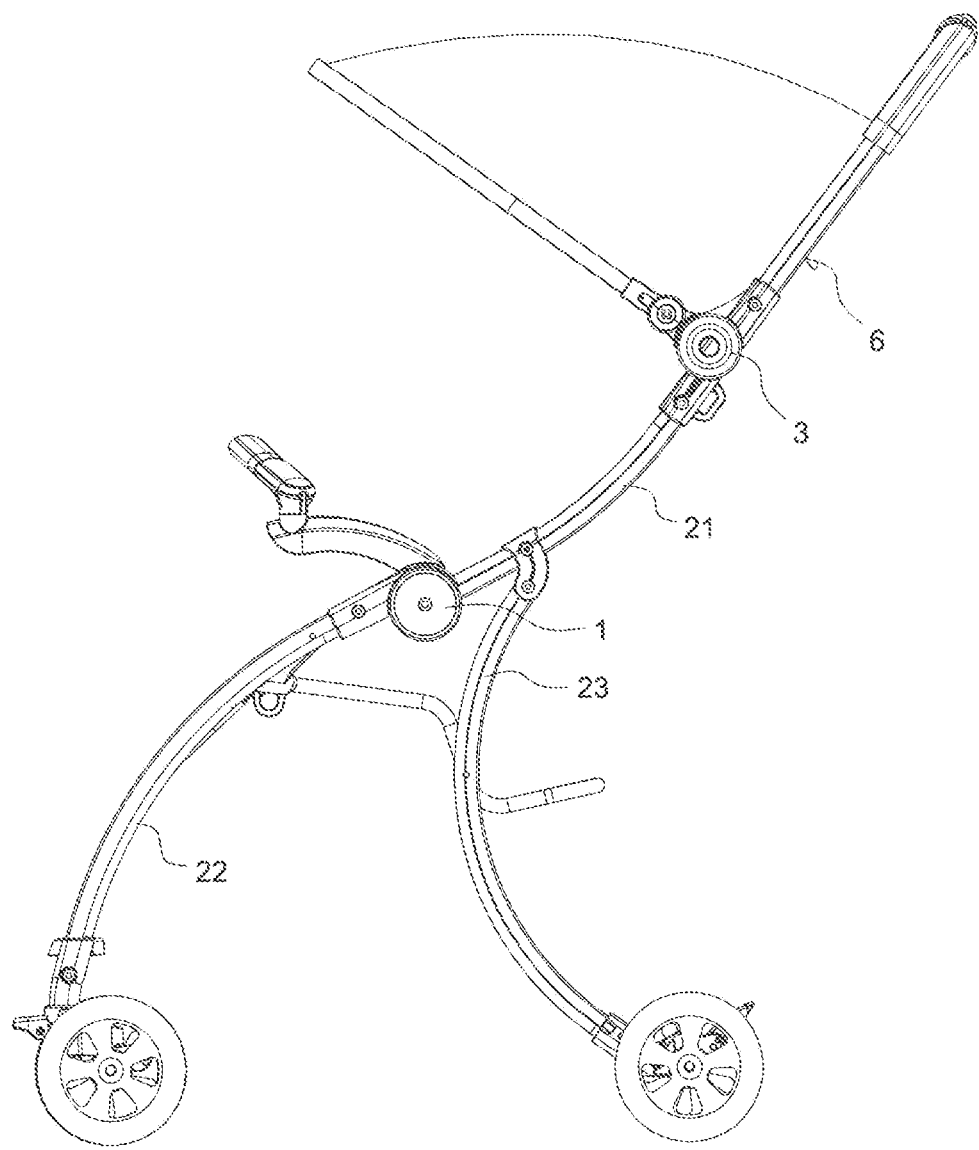
FIG. 2 is a main view of embodiment 1 of the present invention.
Figure 3:
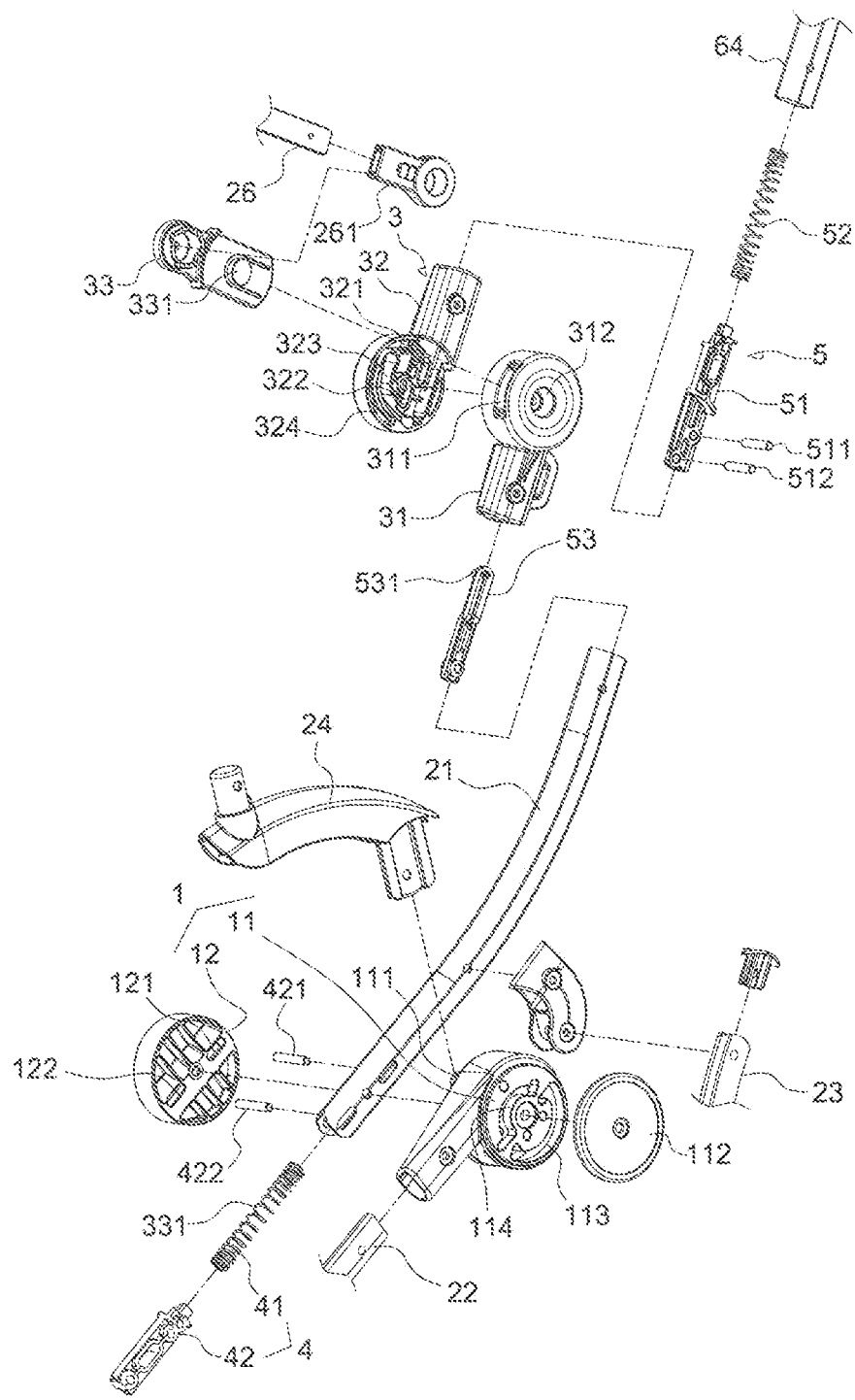
FIG. 3 is a partial exploded view of embodiment 1 of the present invention.
Figure 4:
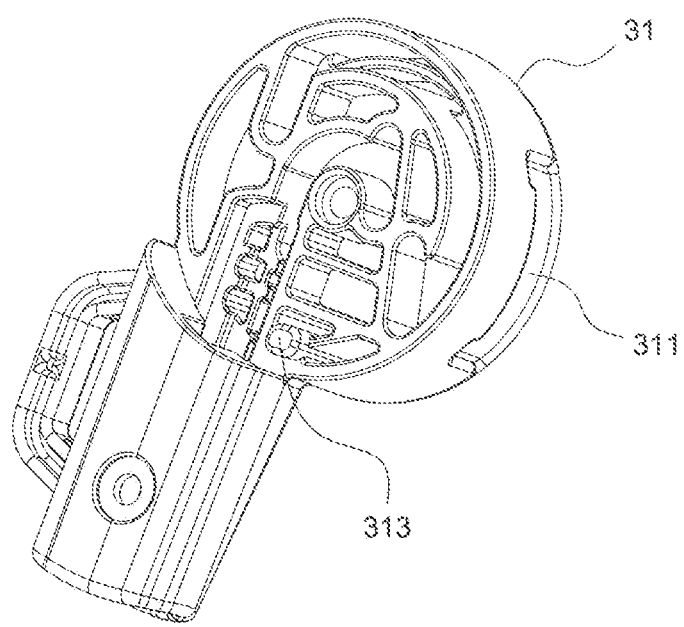
FIG. 4 is a perspective view of the lower joint in embodiment 1 of the present invention.

Below are further detailed descriptions of the present invention combined with specific embodiments and drawings.

A stroller interlocking folding method, including the following steps:

First step: provide a stroller, the stroller including an interlocking folding component;

Second step: open the unlocking device 6 in the interlocking folding component of the stroller, and unlock the second locking device 5 inside the bending joint 3 in the locked state by activating the unlocking device 6, so that the bending joint 3 can be turned;

Third step: turn the bending joint 3. Along with the rotation, the bending joint 3 will pull the first locking device 4 inside the folding joint 1 in the locked state, and unlock the first locking device 4, so that the folding joint 1 can be turned. By turning the folding joint 1, the back leg tubes, handle lower tubes, and bending joints that are linked with the folding joints 1 can be folded, and consequently the stroller can be folded.

The interlocking folding component of the above stroller can adopt any of the following structures:

Embodiment 1

FIG. 1-5 disclose an interlocking folding component for strollers, includes: a handle lower tube 21, bending joints 3 and folding joints 1 installed on the upper and lower ends of the handle lower tube 21. The folding joint 1 is configured with a first locking device 4 to lock itself to prevent rotation; the bending joint 3 is configured with a second locking device 5 to lock itself to prevent rotation. The second locking device 5 is interlocked with the first locking device 4 and can unlock the first locking device 4; the upper end of the bending joint 3 is configured with an unlocking device 6 to unlock the second locking device 5.

The folding joint 1 is installed with front leg tube 22 and armrest 24 that can fold with respect to the handle lower tube 21. The lower end of the handle lower tube 21 is installed with a back leg tube 23 that can rotate, and between the back leg tube 23 and front leg tube 22, a seat frame tube 25 is installed. The seat frame tube 25 forms a support to the back leg tube 23 and the front leg tube 22, so that the stroller can stand stably when unfolded. In addition, the handle lower tube 21, the front leg tube 22, and the back leg tube 23 are all in arc shape. When the stroller is folded, the handle lower tube 21, the front leg tube 22, and the back leg tube 23 can be as close as possible, so that when the stroller is folded, its size become very small for easy transportation and placement.

The folding joint 1 includes: a joint seat 11, a rotating seat 12 installed inside the joint seat 11, able to rotate with respect to the joint seat 11. The joint seat 11 and the rotating seat 12 are respectively connected to and fixed with the front leg tube 22 and the handle lower tube 21. The outer side of the joint seat 11 is configured with a holder 111, and the armrest 24 is inserted into and fixed on the holder 111. In addition, the other side of the joint seat 11 with respect to the holder 111 is installed with a decorating cover 112.

The first locking device 4 includes: first spring 41 and folding pulling bar 42 installed on the lower end of the handle lower tube 21 and extending into the rotating seat 12. The folding pulling bar 42 is installed with first and second iron pins 421, 422, and is connected to the rotating seat 12 and the joint seat 11 through the first and second iron pins 421, 422. Specifically, the rotating seat 12 is configured with first and second strip holes 121, 122 for the first and second iron pins 421, 422 to go through; the joint seat 11 is configured with first and second arc chutes 113, 114 in relative distribution; the first and second iron pins 421, 422 respectively go through the first and second strip holes 121, 122 and fall into the first and second arc chutes 113, 114.

On the two ends of the first arc chute 113, a first slot is formed in the direction of the outer side, and on the two ends of the second arc chute 114, a second slot is formed in the direction of the inner side. When the handle lower tube 21, front leg tube 22, back leg tube 23 and armrest 24 are unfolded with respect to each other, under the action of the first spring 41 on the folding pulling bar 42, the first and second iron pins 421, 422 on the folding pulling bar 42 will respectively stick into the first and second slot, so that the first locking device 4 is locked. At this time, the handle lower tube 21, front leg tube 22, back leg tube 23 and armrest 24 can not rotate, i.e., the folding joint 1 is locked.

The bending joint 3 is installed with a sail frame 26, and the bending joint 3 includes a lower joint 31 and upper joint 32 installed to match each other. The lower joint 31 and upper joint 32 are respectively connected to the handle lower tube 21 and unlocking device 6. The lower joint 31 is installed by insertion with a sail frame seat 33. The sail frame 26 is installed on the sail frame seat 33 through a connecting seat 261. The connecting seat 261 and sail frame seat 33 can rotate with respect to each other. In particular, the lower joint 31 is configured with a socket 311 and a catch hole 312 that is communicated with the socket 311; the outer side of the sail frame seat 33 is configured with an elastic convex block 331. The sail frame seat 331 is inserted into and fixed inside the socket 311, and the elastic convex block 331 on the outer side of the sail frame seat 33 is held inside the catch hole 312.

The second locking device 5 includes: driving pulling bar 51 and second spring 52 that are extended into the upper joint 32 and an interlocking pulling bar 53 installed on the upper end of the handle lower tube 21 and extending into the lower joint 31. The driving pulling bar 51 is connected to the unlocking device 6 through a first steel wire, and the interlocking pulling bar 53 is connected to the folding pulling bar 42 through a second steel wire.

The upper joint 32 is configured with symmetric first and second locking chutes 321, 332, third arc chute 323 and first arc slot 324; the driving pulling bar 51 is installed with third and fourth iron pins 511, 512. The third and fourth iron pins 511, 512 are installed inside the first and second locking chutes 321, 322. Under action of the second spring 52 on the driving pulling bar 51, the third and fourth iron pins 511, 512 are stably positioned inside the first and second locking chutes 321, 322, to prevent relative rotation of the lower joint 31 and upper joint 32 inside the bending joint 3. The upper end of the interlocking pulling bar 53 is configured with fifth iron pin 531. The fifth iron pin 531 falls into the third arc chute 323; the inner side of the lower joint 31 is configured with a sliding shaft 313, and the sliding shaft 313 falls inside the first arc slot 324.

The unlocking device 6 includes: a handle U-tube 64 installed on the upper end of the bending joint 3, an enclosure 61 installed in the middle of the handle U-tube 64, a driving button 62 installed inside the enclosure 61 to drive the second locking device 5 for unlocking, a third spring that matches with the driving button 52, and a safe button 63 to lock the driving button 62 to prevent movement. One end of the first steel wire is connected to the driving button 62; the driving pulling bar 51 is installed on the lower end of the handle U-tube 64. After the unlocking device 6 unlocks the second locking device 5, the handle lower tube 21, sail frame 26 and handle U-tube 64 rotate with respect to each other for folding, and during the rotation, the second locking device 5 is pulled to unlock the first locking device 4, so that the handle lower tube 21, front leg tube 22, back leg tube 23 and armrest 24 rotate with respect to each other for folding, in this way, the stroller can be folded.

Figure 5:
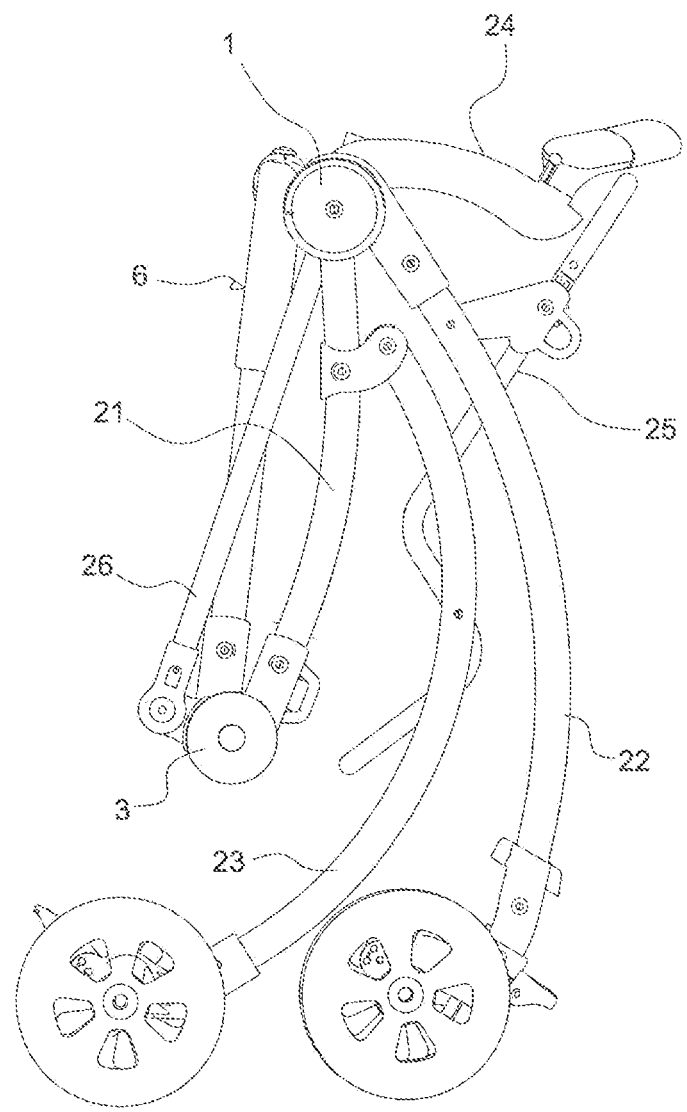
FIG. 5 is a schematic view of embodiment 1 of the present invention after folding.
Figure 6:
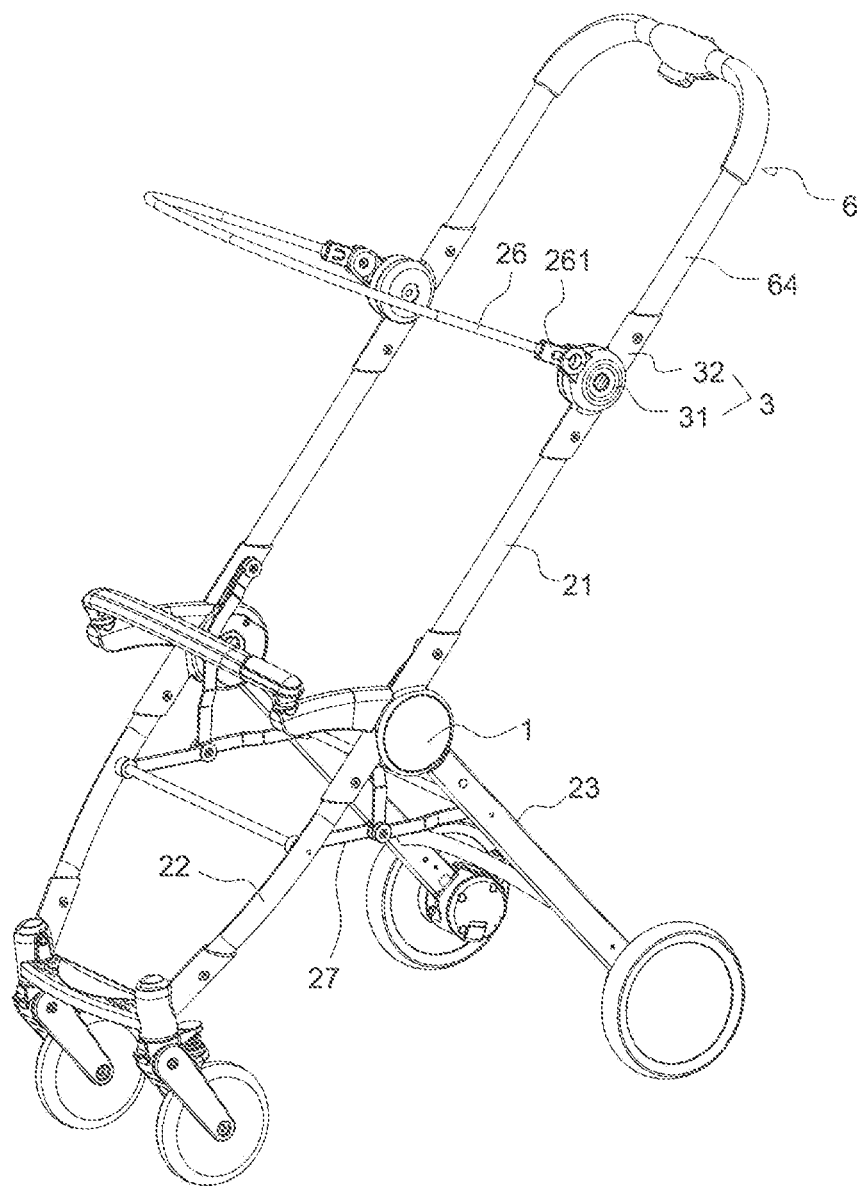
FIG. 6 is a perspective view of embodiment 2 of the present invention.
Figure 7:
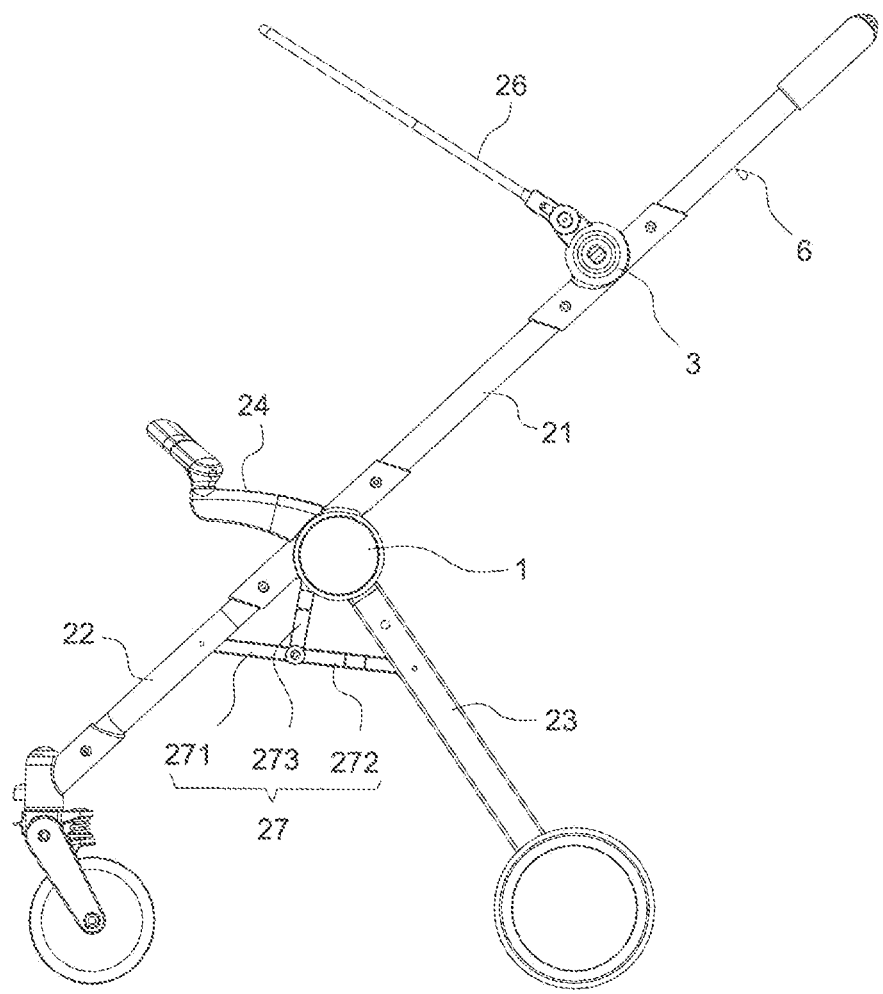
FIG. 7 is a main view of embodiment 2 of the present invention.
Figure 8:
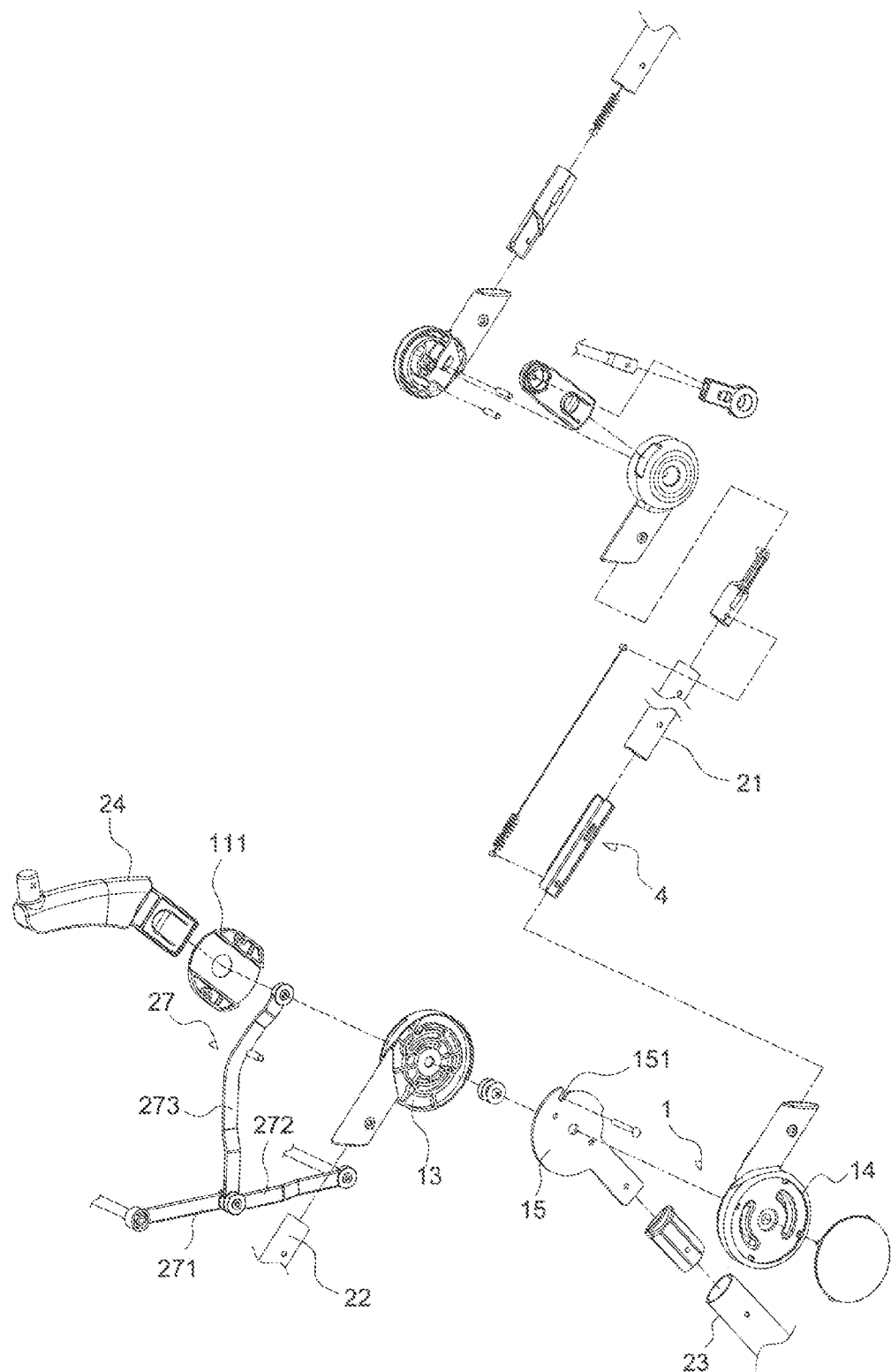
FIG. 8 is a partial exploded view of Embodiment 2 of the present invention.
Figure 9:
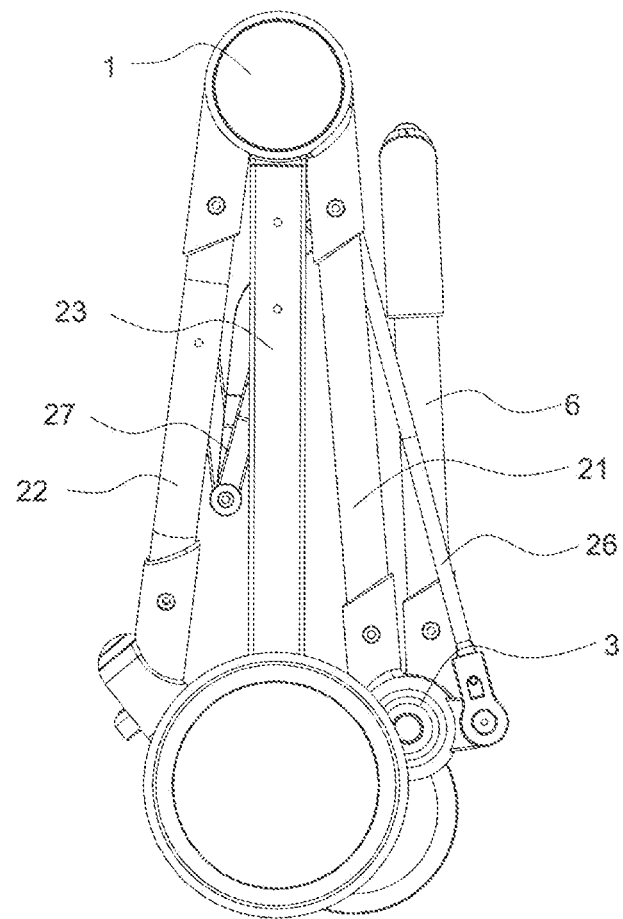
FIG. 9 is a schematic view of embodiment 2 of the present invention after folding.
Figure 10:
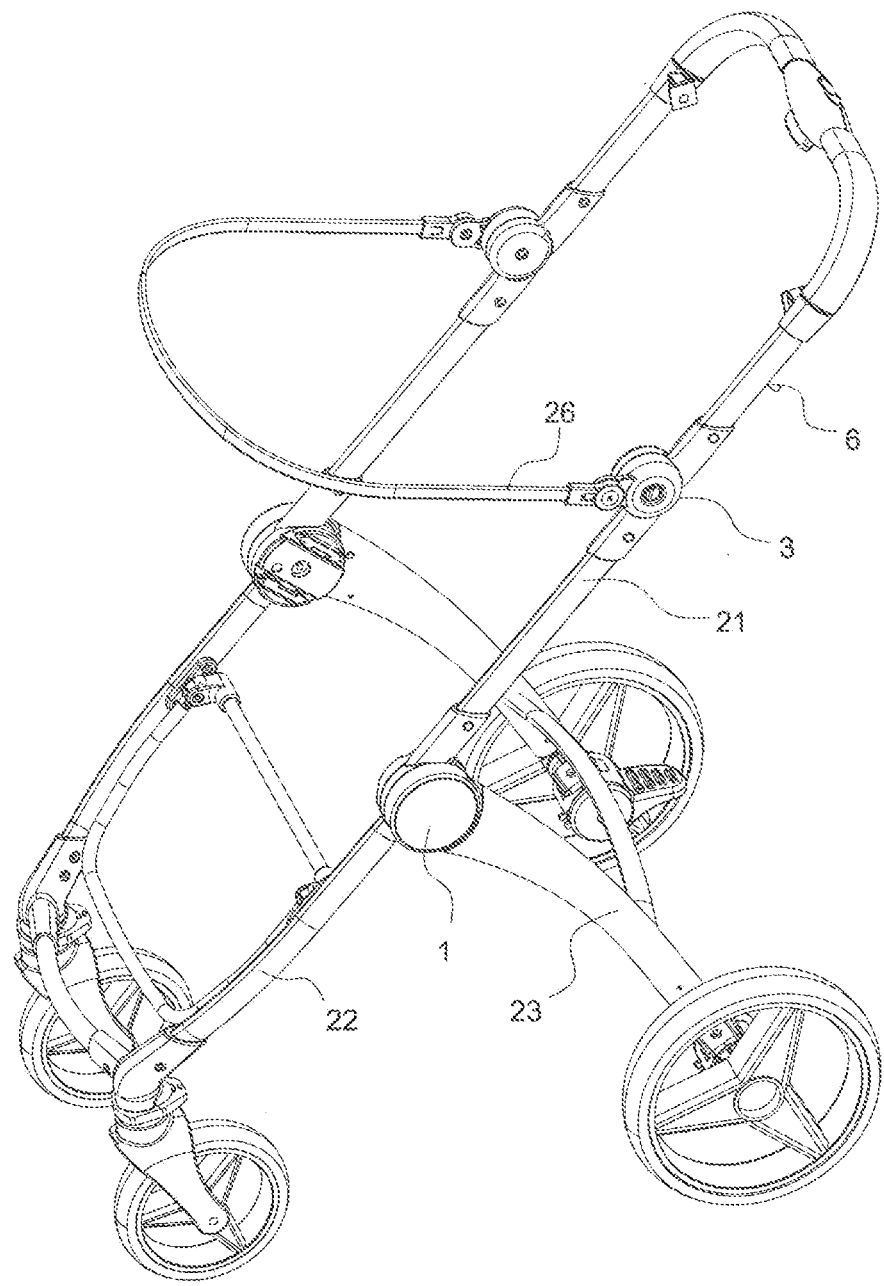
FIG. 10 is a perspective view of embodiment 3 of the present invention.
Figure 11:
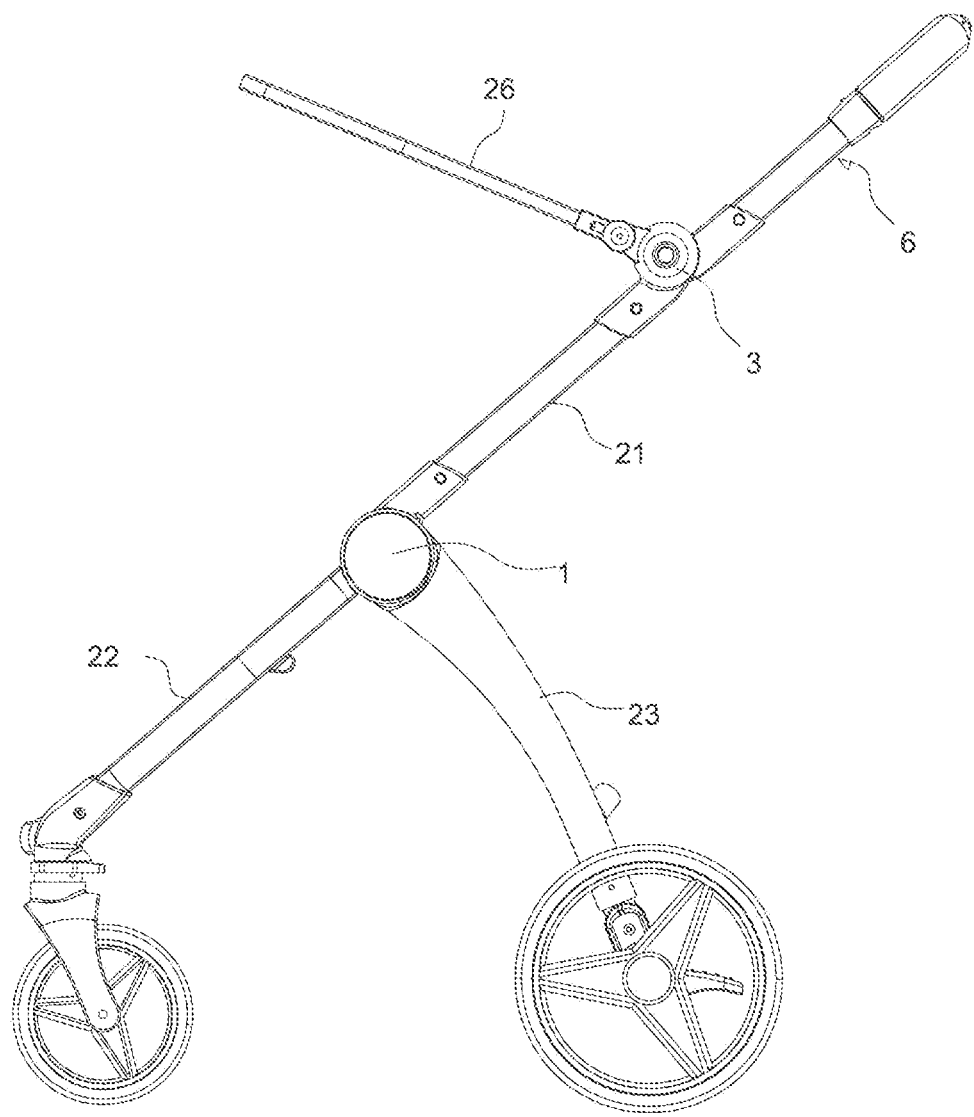
FIG. 11 is a main view of embodiment 3 of the present invention.
Figure 12:
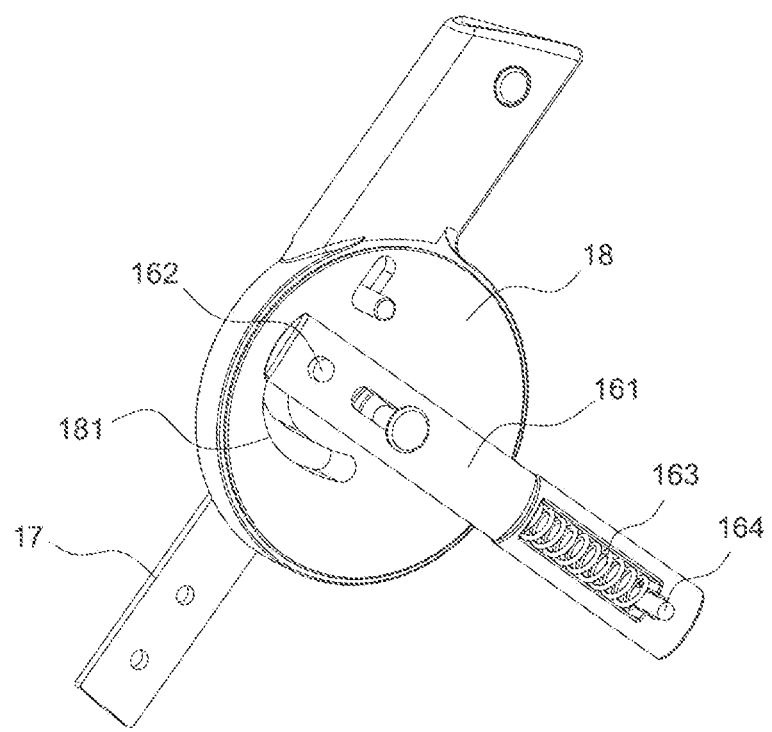
FIG. 12 is a partial assembly view of the folding joint in embodiment 3 of the present invention.
Figure 13:
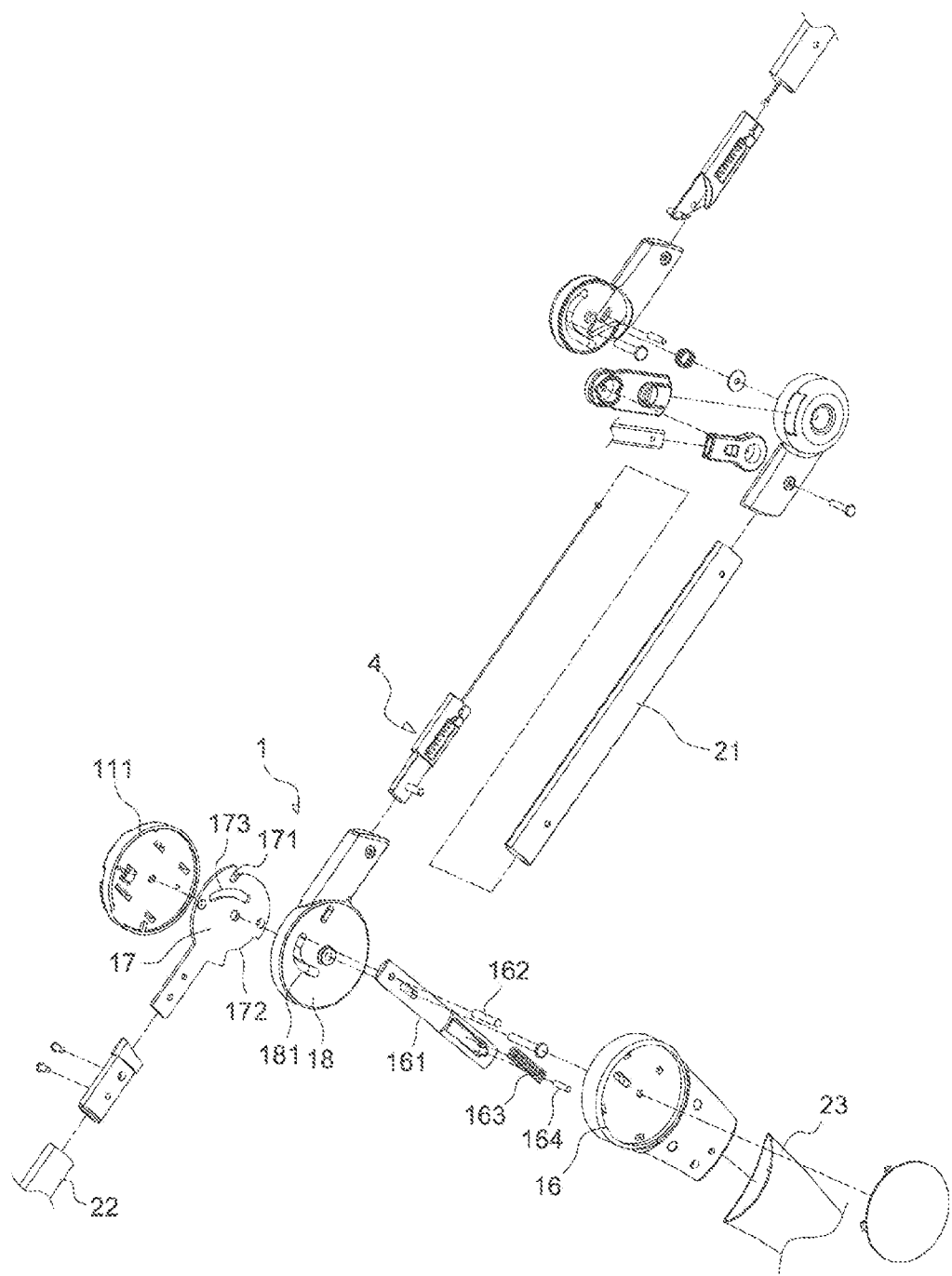
FIG. 13 is a partial exploded view of embodiment 3 of the present invention.

Detailed steps of the above-stated interlocking folding method for strollers are as follow: firstly push the safe button 63 of the unlocking device 6, so that the driving button 62 can be pressed; after pressing the driving button 62, through the first steel wire, the driving button 62 will pull the driving pulling bar 51 in the second locking device 5, so that the third and fourth iron pins 511, 512 in the driving pulling bar 51 will be separated from the first and second locking chutes 321, 322. In this way, the first unlocking action is completed. At this time, the lower joint 31 and upper joint 32 in the bending joint 3 rotate with respect to each other, so as to fold the handle lower tube 21, sail frame 26 and handle U-tube 64. When the upper joint 32 rotates, the fifth iron pin 531 on the upper end of the interlocking pulling bar 53 will move along the third arc chute 323 in the upper joint 32, to realize an upward pulling action. At this time, the interlocking pulling bar 53 pulls upward the second steel wire that is linked with it, so as to drive the first and second iron pins 421, 422 in the folding pulling bar 42 to respectively separate from the first and second slots and fall into the first and second arc chutes 113, 114, and realize the second unlocking action. At this time, the handle lower tube 21, front leg tube 22, back leg tube 23 and armrest 24 can all rotate to realize the folding action, as shown in FIG. 5.

To conclude, the present invention enables folding the stroller simply by using one hand to activate the unlocking device 6, with easy and safe operation. After the folding, the front wheels and back wheels installed on the ends of the front and back leg tubes 23 are located in the same horizontal plane, so that the stroller can stand stably. Such a convenience for storage and transportation offers a high competitiveness in the market.

When it is needed to unfold the stroller, simply rotate the folding joint 1 and the bending joint to unfold the handle lower tube 21, front leg tube 22, back leg tube 23, armrest 24, seat frame tube 25, sail frame 26 and handle U-tube 64. Under the action of the springs, the first locking device 4 and second locking device 5 will be automatically reset to lock the folding joint 1 and bending joint to provide stability after unfolding the stroller.

In addition, the above-stated unlocking device 6 can also adopt other structures, for example, the following structure: the unlocking device 6 includes: handle U-tube 64 installed on the upper end of the bending joint 3, sliding sleeve installed in the middle of the handle U-tube 54. The sliding sleeve is used to connect with one end of the first steel wire for pulling. Or, the following structure can be adopted: the unlocking device 6 includes: first handle U-tube and second handle U-tube installed on the upper end of the bending joint 3 that can be pivotally connected with each other. A spring is configured between the first handle U-tube and second handle U-tube, so that they are pushed away from each other. When it is needed to fold the stroller, press the first handle U-tube and second handle U-tube together, to pull one end of the first steel wire upward.

Embodiment 2

Referring to FIG. 6-9, the structure of Embodiment 2 differs from the structure of Embodiment 1 in that: the folding joint 1 in Embodiment 2 adopts a different structure, and the connection is also different. Specifically, the folding joint 1 is installed with handle lower tubes 21 that can be folded with respect to the front leg tube 22, armrest 24 and back leg tube 23, wherein, between the back leg tube 23, handle lower tube 21 and front leg tube 22, an interlocking hinge joint component 27 is installed. The interlocking hinge joint component 27 replaces the seat frame tube 25 mentioned in Embodiment 1. The interlocking hinge joint component 27 not only provides an aid for folding the stroller, but also provides a support after the folding joint 1 is open, so that the present invention can be used more conveniently.

The above-stated handle lower tube 21, front leg tube 22 and back leg tube 23 are all straight tubes.

The folding joint 1 includes: an inner joint seat 13, an outer joint seat 14 installed on the outer side of the inner joint seat 13, capable of rotation with respect to the inner joint seat 13 and a middle joint seat 15 installed between the inner joint seat 13 and outer joint seat 14. The inner, outer and middle joint seats 13, 14, 15 are respectively connected with the front leg tube 22, handle lower tube 21 and back leg tube 23. And the other side of the inner joint seat 13 relative to the outer joint seat 14 is installed with a holder 111. The armrest 24 is inserted into and fixed on the holder 111.

The middle joint seat 15 is in the shape of a plate. Its periphery is configured with a positioning groove 151; the interlocking hinge joint component 27 includes: first, second and third interlocking plates 271, 272, 273 with their ends hinged with each other; the other terminal portion of the first interlocking plate 271 is connected with the front leg tube 22, the other terminal portion of the second interlocking plate 272 is connected with the back leg tube 23, and the other terminal portion of the third interlocking plate 273 is connected with the handle lower tube 21.

The working principle of Embodiment 2 is basically the same as that of Embodiment 1, and the technical effect is also the same. Therefore, no further detailed descriptions are provided here.

Embodiment 3

Referring to FIG. 10-13, the structure of Embodiment 3 differs from the structure of Embodiment 1 in that: the folding joint 1 in Embodiment 3 adopts a different structure and the connection is also different. Specifically, the folding joint 1 is installed with front leg tube 22 and back leg tube 23 that can be folded with respect to the handle lower tube 21.

The above-stated handle lower tube 21, front leg tube 22 and back leg tube 23 are all straight tubes.

The folding joint 1 includes first, second and third joint seats 16, 17, 18 that are hinged with each other, wherein, the second joint seat 17 is in the shape of a plate, and the first, second and third joint seats 16, 17, 18 are respectively connected with the back leg tube 23, front leg tube 22 and handle lower tube 21. The outer side of the third joint seat 18 is installed with a holder 111. The holder 111 covers the outside of the second joint seat 17.

The periphery of the second joint seat 17 is configured with a positioning groove 171 and a sliding notch 172, and the middle part of the second joint seat 17 is further configured with a fourth arc chute 173; the third joint seat 18 is further configured with a fifth arc chute 181; the first joint seat 16 is configured with a positioning pulling bar 161 to position the first, second and third joint seats 16, 17, 18 after unfolding. The upper end of the positioning pulling bar 161 is installed with a sixth iron pin 162. The sixth iron pin 162 extends into the fourth and fifth arc chutes 173, 181. The lower end of the positioning pulling bar 161 is installed with a fourth spring 163 and a positioning iron pin 164 that match each other. The positioning iron pin 164 is installed inside the positioning chute configured in the first joint seat 16.

The above-stated positioning pulling bar 161 provides a positioning support for the folding joint 1 after unfolding, to avoid unexpected folding after unfolding. In this way, the present invention can be used more conveniently.

The working principle of Embodiment 3 is basically the same as that of Embodiment 1, and the technical effect is also the same. Therefore, no further detailed descriptions are provided here.

Although the invention has been explained with respect to its preferred embodiment, it is to be understood that many other possible modifications and variations can be made without departing from the spirit and scope of the invention as hereinafter claimed.

I claim:

1. An interlocking folding component for strollers, comprising: a handle lower tube (21), first folding joints (1) and second folding joints (3) installed on an upper end and lower end of the handle lower tube (21); the first folding joint (1) is configured with a first locking device (4) which locks the first folding joint (1) to avoid rotation; the second folding joint (3) is configured with a second locking device (5) which locks the second folding joint (3) to avoid rotation; the second locking device (5) is interlocked with the first locking device (4) and can unlock the first locking device (4); an upper end of the second folding joint (3) is configured with an unlocking device (6); the unlocking device (6) can be driven to unlock the second locking device (5), so that the second folding joint (3) can rotate, and during rotation, the second folding joint (3) will pull and unlock the first locking device (4), so that the first folding joint (1) can rotate to fold the stroller, wherein the second folding joint (3) includes lower joint (31) and upper joint (32) that are installed to match each other; the lower joint (31) and upper joint (32) are respectively connected with the handle lower tube (21) and unlocking device (6).

2. The device defined in claim 1, wherein the folding joint (1), wherein the first folding joint (1) is installed with a front leg tube (22) that can fold with respect to the handle lower tube (21); the lower end of the handle lower tube (21) is installed with a back leg tube (23) that can rotate, and between the back leg tube (23) and front leg tube, a seat frame tube (25) is installed; the handle lower tube (21), the front leg tube (22), and the back leg tube (23) are all in arc shape.

3. The device defined in claim 1, wherein the first folding joint (1) is installed with front leg tube (22), armrest (24) and back let tube (23) that can fold with respect to the handle lower tube (21); between the back leg tube (23), handle lower tube (21) and front leg tube (22), an interlocking hinge joint component (27) is installed.

4. The device defined in claim 3, wherein the first folding joint (1) includes: an inner joint seat (13), an outer joint seat (14) installed on the outer side of the inner joint seat (13) and capable of rotation with respect to the inner joint seat (13) and a middle joint seat (15) installed between the inner joint seat (13) and outer joint seat (14); the inner, outer, and middle joint seats (13, 14, 15) are respectively connected to the front leg tube (22), handle lower tube (21) and back leg tube (23), and the middle joint seat (15) is in the shape of a plate, which includes a positioning groove (151) defined in a periphery thereof.

5. The device defined in claim 3, wherein the interlocking hinge joint component (27) includes a first, second and third interlocking plates (271, 272, 273), each having one end hinged with each other; the first interlocking plate (271) having another end is connected with the front leg tube (22), the second interlocking plate (272) having another end is connected with the back leg tube (23), and the third interlocking plate (273) having another end is connected with the handle lower tube (21).

6. The device defined in claim 1, wherein the first folding joint (1) in installed with front leg tube (22) and back leg tube (23) that can fold with respect to the handle lower tube (21).

7. The device defined in claim 6, wherein the first folding joint (1) includes a first, second, and third joint seat (16, 17, 18) that are hinged with each other; the second joint seat (17) is in the shape of a plate, and the first, second, and third joint seats (16, 17, 18) are respectively connected with the back leg tube (23), front leg tube (22) and handle lower tube (21).

8. The device defined in claim 7, wherein the first joint seat (16) is configured with a positioning pulling bar (161) to position the first, second, and third joint seats (16, 17, 18) after unfolding, and the upper end of the positioning pulling bar (161) is installed with a sixth iron pin (162), and connected with the second and third joint seat (17, 18) through the sixth iron pin (162); the lower end of the positioning pulling bar (161) is installed with fourth spring (163) and positioning iron pin (164) that match each other; the positioning iron pin (164) is installed in the positioning chute configured inside the first joint seat (16).

9. The device defined in claim 1, wherein a seizing part (43) on the inner wall of the bottom edge of the filter container (4), the filter screen (42) comprises a silica gel cover (421) gripping the seizing part (43) and a screen (422) at the bottom of the silica gel cover (421).

10. The device defined in claim 9, wherein the first locking device (4) comprises a first spring (41) and a folding pulling bar (42) installed on the lower end of the handle lower tube (21) and extending into the rotating seat (12); the folding pulling bar (42) is installed with first and second iron pins (421, 422), and is connected to the rotating seat (12) and the joint seat (11) through the first and second iron pins (421, 422).

11. The device defined in claim 1, wherein the second locking device (5) includes a driving pulling bar (51) and a second spring (52) that extend into the upper joint (32), and an interlocking pulling bar (53) installed on an upper end of the handle lower tube (21) and extending into the lower joint (31); the driving pulling bar (51) is connected to the unlocking device (6) through a first steel wire; the interlocking pulling bar (53) is connected to the first locking device (4) through a second steel wire.

12. The device defined in claim 1, wherein the unlocking device (6) includes a handle U-tube (64) installed on the upper end of the second folding joint (3), an enclosure (61) installed in the middle of the handle U-tube (64), a driving button (62) installed inside the enclosure (61) to drive the second locking device (5) for unlocking, third spring to match the driving button (62), and a safe button (63) to lock the driving button (62) to prevent its movement.

13. An interlocking folding method for strollers, comprising the following steps:
    first step: provide a stroller, the stroller including an interlocking folding component for strollers as stated in claim 1;
    second step: activate the unlocking device (6) of the interlocking folding component for strollers, and drive the unlocking device (6) to unlock the locked second locking device (5) in the second folding joint (3), so that the second folding joint (3) can rotate;
    third step: rotate the second folding joint (3); during rotation, the second folding joint (3) will pull the locked first locking device (4) inside the first folding joint (1), and unlock the first locking device (4), so that the first folding joint (1) can rotate; then, by rotating the first folding joint (1), the front and back leg tubes, handle lower tubes, and bending joints connected with the first folding joint (1) can be closed to fold the stroller.

* * * * *